March 5, 1946. P. ORR Re. 22,731

SYNCHRONIZER COUPLING

Original Filed March 24, 1943 3 Sheets-Sheet 1

Inventor:
Palmer Orr
By: Edward C. Gilfillan
Atty

March 5, 1946. P. ORR Re. 22,731

SYNCHRONIZER COUPLING

Original Filed March 24, 1943 3 Sheets-Sheet 2

Inventor:
Palmer Orr
By: Edward C. Gritzbaugh
Atty.

March 5, 1946. P. ORR Re. 22,731

SYNCHRONIZER COUPLING

Original Filed March 24, 1943 3 Sheets-Sheet 3

Inventor:
Palmer Orr
By: Edward P. Fritzhaugh
Atty.

Reissued Mar. 5, 1946

Re. 22,731

UNITED STATES PATENT OFFICE 22,731

SYNCHRONIZER COUPLING

Palmer Orr, Muncie, Ind., assignor to Borg-Warner Corporation, Chicago, Ill., a corporation of Illinois Original No. 2,360,711, dated October 17, 1944, Serial No. 480,274, March 24, 1943. Application for reissue November 10, 1945, Serial No. 627,963

6 Claims. (Cl. 74—289)

This invention relates to power transmitting devices of the variable type and particularly to a positive coupling combined with such a power transmitting device for controlling the variation in torque produced by the mechanism.

There has been devised a positive coupling device which is supplied with spiral splines so as to take advantage of the relative direction of rotation between the elements to be coupled to effect an axial shift of the movable element thereof. To limit the axial movement of the shiftable element, straight or axial splines are likewise provided on another portion of the shiftable element so that when the shift is completed, the shiftable element is connected to the spirally splined element through a secondary straight splined connection. The last-named connection provides a lock which prevents further axial movement of the shiftable element. To effect a shift in the opposite direction the straight splined connection must first be broken and then the direction of torque is reversed, thereby causing the spirally splined element to move in the opposite direction. In one form, pawls are provided to synchronize the shift, the pawls being so related with respect to the teeth to be mated that when a pawl is in a driving position, the teeth of the clutch will be perfectly aligned and will engage due to the driving action of the pawl on the spirally splined shiftable element.

Thus it will be observed that in the coupling just described two sets of splines are necessary, the first being spiralled to provide the necessary axial movement and the second being straight to provide the necessary lock to prevent further movement of the spirally splined element. It will be appreciated that both sets of splines are rather expensive and that it would be desirable to reduce the cost of such a coupling to a minimum. The principal object of this invention, therefore, is to provide a positive coupling of the type described which will eliminate some of the splines and hence result in a less expensive mechanism.

Another object of this invention is to provide a simple and inexpensive lock for a coupling of the type described.

A further object of this invention is to provide a transmission of the stepped-type wherein changes in speed ratio are effected by means of a coupling device having a spirally splined, axially shiftable element and a simple, inexpensive, locking device for the axially shiftable element.

A still further object of this invention is to substitute an inexpensive ball or bean-type lock for the straight-splined lock which has been proposed for this type of coupling.

These and other objects of the invention will become apparent from the following specification when taken together with the drawings which form a part thereof and in which.

Figure 1:
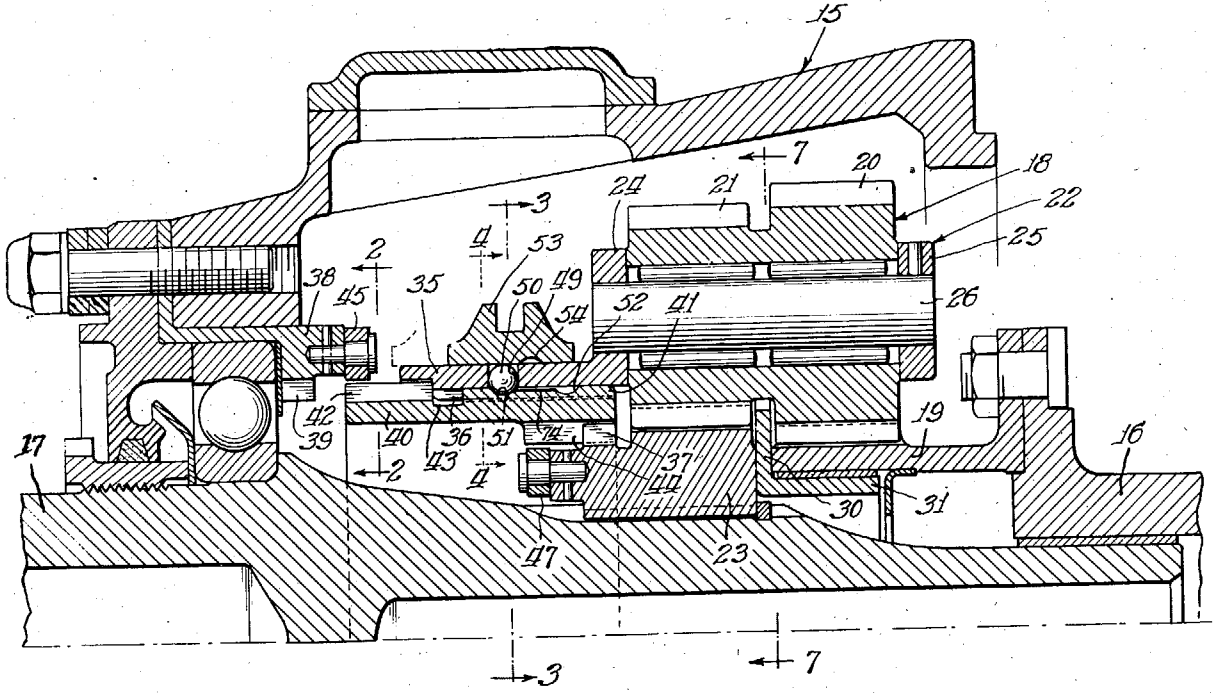
Fig. 1 is a partial elevation in section of a transmission embodying a shifting device constructed in accordance with this invention.

Referring to Fig. 1 for a detailed description of the invention, the transmission is enclosed in a housing 15 and serves to connect a drive shaft shown at 16, to a driven shaft 17. Drive shaft 16 may be the crank shaft of an airplane engine and driven shaft 17 may be the propeller shaft although it will be understood that the invention is not limited to such use. The transmission itself is designated by reference character 18 and is comprised of a sun gear 19 bolted to drive shaft 16, pairs of planet pinions 20 and 21 made in the form of spools so as to be rotatable together and mounted on planet shafts 26 in a carrier 22 which is rotatable about the axis of shaft 17. Sun gear 19 engages planet pinion 20 and planet pinion 21 engages a larger sun gear 23 which is splined to shaft 17 and thus caused to be rotatable therewith. Carrier 22 includes a front ring 24 and a rear ring 25 in which planet shafts 26 are retained.

Figure 7:
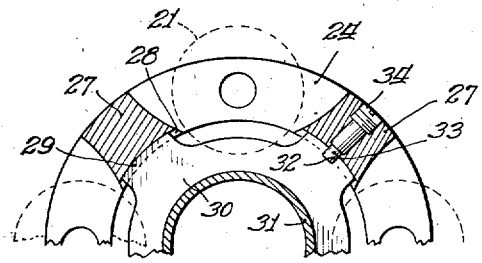
Fig. 7 is a fragmentary elevation taken along line 7—7 of Fig. 1 showing the detailed construction of the planet carrier.
Figure 8:
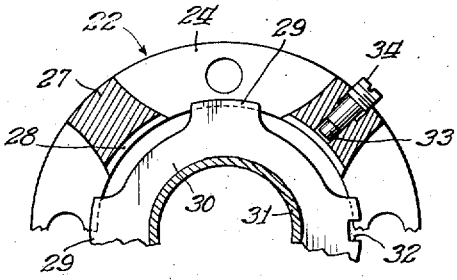
Fig. 8 is a view similar to Fig. 7 showing the planet carrier prior to assembly.

Referring to Figs. 7 and 8, planet carrier 22 is provided with axially extending bars 27 which pass between the planet gears and which are provided with grooves 28 on the interior thereof. Cooperating with grooves 28 are lugs 29 which are formed in a radial flange 30 of a bushing 31. Said bushing 31 is mounted on the inside of sun gear 19 and provides a support for the carrier.

As shown in Fig. 8, lugs 29 are assembled with respect to bars 27 by first assembling the planets and cage around the lugs 29 so that said lugs extend into the space between the planet gears 20 and 21 and then the radial flange is rotated relative to bars 27 until the two assume a position as shown in Fig. 7. A notch 32 is provided in one of the lugs 29, said notch being adapted to cooperate with the reduced end 33 of a set screw 34 which is advanced into the notch so as to prevent the carrier from rotating off its support. Grooves 28 fit snugly over lugs 29 so as to give a firm support to the entire carrier.

It will be obvious that in order to obtain a reduced drive through the transmission just described carrier 22 must be held so that the drive is then from drive shaft 16 to sun gear 19, then to pinions 20 and 21, and then to sun gear 23. Since sun gear 23 is splined to driven shaft 17, the latter will be rotated at the same speed as sun gear 23. Due to the difference in size between sun gears 19 and 23, the latter will be rotated at a reduced speed.

To obtain a direct drive between drive shaft 16 and driven shaft 17, one of the sun gears must be connected to the planet cage so as to lock the entire planetary gear set together for rotation as a single unit. The means by which the two ratios are obtained will now be described.

Carrier 22 is provided with a cylindrical flange 35 which may be an extension of front ring 24. This flange is axially fixed, but is rotatable with planet carrier 22. On the inside of flange 35 are internal splines 36, the direction of the spiral being shown in Fig. 6. It is assumed that the direction of rotation of drive shaft 16 is clockwise when the transmission is viewed from the right-hand side of Fig. 1.

Sun gear 23 is provided with external teeth 37 which are of the straight axial type.

Secured to housing 15 is an internally toothed ring 38, the teeth being shown at 39. It will be noted that external teeth 37 on sun gear 23 are located within the cylindrical flange 35 on carrier 22 and that internal teeth 39 on ring 38 are substantially aligned with flange 35. In order to effect a connection between flange 35 and stationary ring 38 an axially slidable sleeve 40 is provided. This sleeve is formed with external spiral splines 41 which cooperate with internal spiral splines 36 on flange 35, and with straight external splines 42 which are separated from the spiral splines 41 by a circumferential groove 43 and which are adapted to engage internal teeth 39 on fixed member 38.

Figure 2:
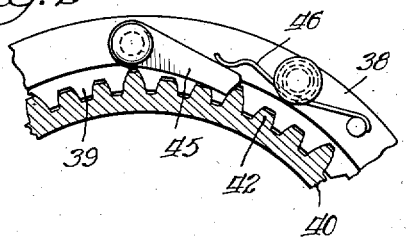
Fig. 2 is a fragmentary section taken along line 2—2 of Fig. 1.
Figure 3:
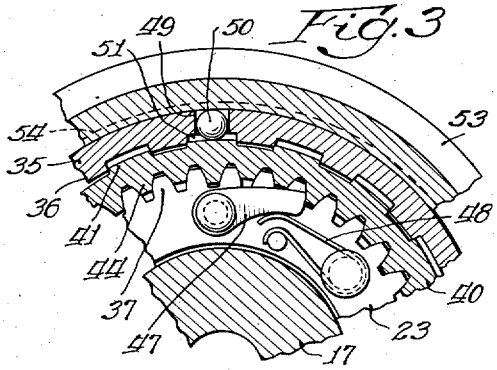
Fig. 3 is a fragmentary section taken along line 3—3 of Fig. 1.

Similarly, flange 35 may be connected to sun gear 23 through the intermediary of internal splines 36, external splines 41 and internal straight splines 44 located on the inside and to the right of sleeve 40 (Fig. 1). It will be noted that straight splines 42 and 44 are considerably longer than internal teeth 39 and external teeth 37 with which the straight splines are adapted to mesh. As shown in Fig. 1, straight splines 44 are engaged with external teeth 37 so as to form a drive between sun gear 23 and carrier 22. External splines 42 are made long enough to engage one or more pawls 45 mounted on fixed ring 38 (Fig. 2) and held against splines 42 by means of a spring 46. It will be observed that every third spline is of normal size and the two intervening splines are of reduced height so as to permit pawls 45 to bear against the normal splines to obtain a drive therefrom.

In a similar manner, when sleeve 40 is engaged with internal splines 39 on fixed ring 38, internal splines 44 on sleeve 40 will be completely disengaged from external splines 37 on sun gear 23, but they are made sufficiently long so as to remain in engagement with a pawl 47 pivotally mounted on sun gear 23 and held against the internal splines 44 by means of a spring 48. Internal splines 44 are likewise formed of uneven height so that every third spline is of normal height and the intervening two splines are of reduced height, thus permitting pawl 47 to engage the splines of normal height.

Assuming that sleeve 40 is free to move axially in either direction, it is apparent that a shift to reduced drive may be effected by accelerating shaft 16 while permitting shaft 17 to rotate at substantially the same speed. Eventually, sleeve 40 and carrier 22 will stop and begin to rotate in the opposite direction and at such time pawl 45 will cease to ratchet over splines 42 and will engage a spline of normal height thereby preventing sleeve 40 from continuing to rotate with flange 35. This establishes a speed differential between sleeve 40 and flange 35 which, because of the spiral spline connection therebetween, results in an axial movement of sleeve 40 toward internal splines 39. The length and position of pawl 45 are so chosen that splines 42 under such conditions are perfectly aligned with internal splines 39 and complete engagement may be effected without difficulty.

Assuming external splines 42 to be engaged with internal splines 39 and sleeve 40 to be free to move axially, pawl 47 on sun gear 23 is in engagement with internal splines 44 at the opposite end of sleeve 40 and is ready to take effect just as soon as the direction of rotation is reversed. Thus, when torque is released to decelerate shaft 16, the relative direction of rotation between sleeve 40 and flange 35 is reversed and pawl 47 then takes hold and causes sleeve 40 to move to the right as shown in Fig. 1. Pawl 47 is likewise so positioned that when it is in engagement with the normal sized internal splines 44, the splines will likewise be in perfect alignment with external teeth 37 and the movement of sleeve 40 to the right as shown in Fig. 1 will continue until complete engagement between external teeth 37 and internal splines 44 is effected.

It is obvious that unless some locking means is provided for sleeve 40, the sleeve will continue to oscillate between engagement with internal splines 39 and external teeth 37 with each reversal of torque between the driving and driven shafts. To maintain sleeve 40 in any given position, therefore, requires that some locking means be provided. Such locking means will now be described.

It will be observed that axial flange 35 is provided with an opening 49 in which is located a locking member 50. In the form selected for illustration, the locking member is comprised of a ball, but it is understood that any of the usual interlocking devices with cammed ends may be used. Said member has a diameter which is greater than the thickness of flange 35 and is adapted to ride in either one of two depressions 51 and 52 located in sliding sleeve 40. To reduce any tendency toward self-locking and also to provide a faster and more dependable shift, the splines between depressions 51 and 52 are relieved as shown at 74. Surrounding flange 35 is a shift collar 53 which is likewise provided with a depression 54. Thus when depression 54 and depression 51 or 52 are in alignment, movement of sleeve 40 axially is possible, but when depression 54 is not aligned with depression 51 or depression 52, the ball 50 locks sleeve 40 in place. Thus, when it is desired to shift from the position shown in Fig. 1 to the position wherein carrier 22 is held, collar 53 is slid to the left as shown in Fig. 1 until depression 54 is aligned with depression 51 and then, assuming that the torque reaction is in the proper direction, sleeve 40 will move to the left to engage external splines 42 with internal teeth 39. To lock sleeve 40 in this position it is necessary to continue moving shift collar 53 to the left immediately after ball 50 drops into depression 52. Similarly, when it is desired to lock sleeve 40 in the position shown in Fig. 1 from the position just described, it is necessary first to move shift collar 53 so that depression 54 is in line with depression 52 and then, assuming that the torque reaction is in the proper direction, sleeve 40 will move to the right into the position shown in Fig. 1 and immediately upon ball 50 dropping into depression 51, collar 53 must be moved to the position shown in Fig. 1.

Figure 6:
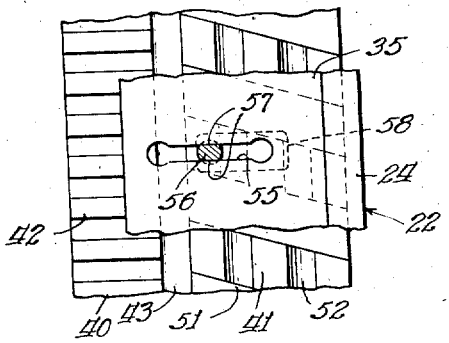
Fig. 6 is a fragmentary plan view of the coupling device device taken along line 6—6 of Fig. 5.
Figure 4:
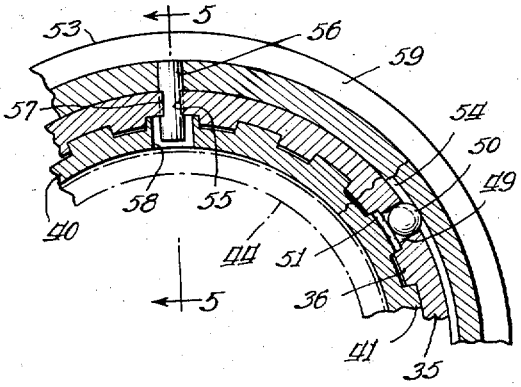
Fig. 4 is a fragmentary section through the coupling device taken along line 4—4 of Figs. 1 and 5.
Figure 5:
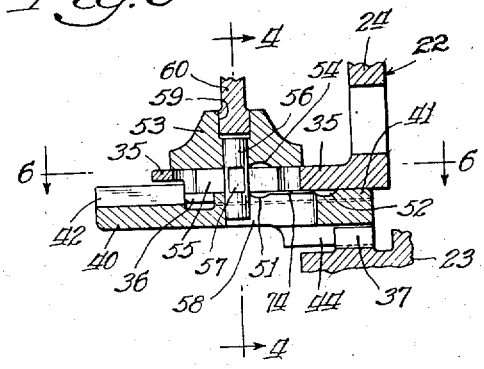
Fig. 5 is a fragmentary side elevation in section of the coupling device taken along line 5—5 of Fig. 4.

To make sure that shift collar 53 pauses when depression 54 is aligned with either depression 51 or depression 52 to give ball 50 an opportunity to be cammed out of the way of sleeve 40, the device shown in Figs. 4, 5, and 6 is used.

Referring now to Figs. 4, 5, and 6, flange 35 has formed therein one or more axial slots 55. Slot 55 is located in the region over which shift collar 53 operates. Said collar 53 is provided with a radial pin 56 which is flattened along its sides as at 57 so as to pass through slot 55 without turning. Similarly, sleeve 40 is provided with a somewhat rectangular slot 58 which is considerably wider than pin 56 and into which said pin 56 extends. Since sleeve 40 and flange 35 are connected together by means of spiral splines, it will be apparent that sleeve 40 will at times move circumferentially with respect to flange 35 and it is to accommodate the relative circumferential movement between these two parts that slot 58 is made wider.

The axial length and location of slot 58 is so chosen that, assuming sleeve 40 to be in the position shown in Fig. 1, shift collar 53 will move axially until pin 56 strikes the left hand (Fig. 5) side of slot 58, and it is at exactly this point that depression 54 in collar 53 will be aligned with ball 50 and depression 51 in sleeve 40. Collar 53, therefore, must pause in its axial movement until the torque reaction moves shift sleeve 40 into engagement with internal teeth 39, that is, until the shift sleeve passes from one extreme position to its other extreme position. At that time, collar 53 may then continue its movement a short distance so as to lock ball 50 and sleeve 40 in place. The same action takes place when the movement is from engagement with internal teeth 39 to engagement with external teeth 37 and sun gear 23.

Figure 9:
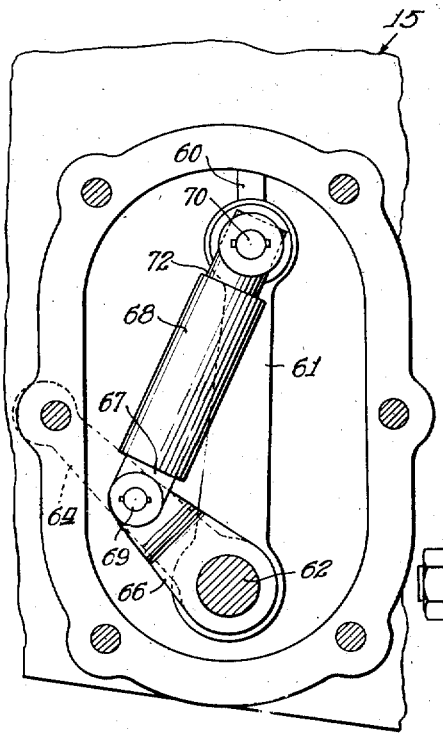
Fig. 9 is a fragmentary elevation of the controls for the shifting mechanism taken along line 9—9 of Fig. 10.
Figure 10:
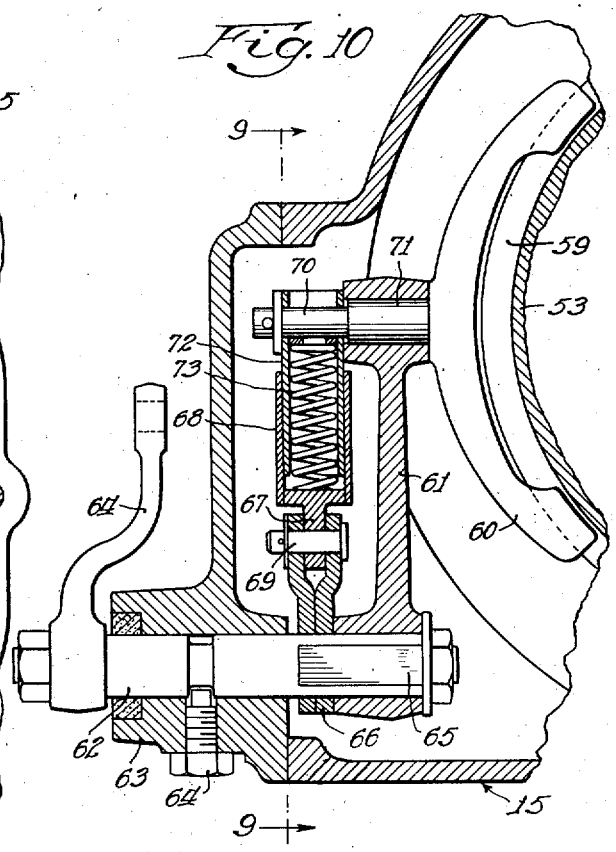
Fig. 10 is a fragmentary section of the shifting mechanism.

The means by which shift collar 53 is moved in either direction is shown in Figs. 9 and 10. Shift collar 53 is provided with a circumferential groove 59 in which is located a shift yoke 60. Said shift yoke is pivotally mounted at 71 in an arm 61 which in turn is mounted to rotate freely about a control shaft 62. Said control shaft is rotatably mounted in a boss 63 in housing 15 and is held against axial movement by means of a threaded pin 64. Shaft 62 may be oscillated from the exterior by means of a lever 64. The inner end of shaft 62 is ground to provide one or more flat spots 65 which serve to drive a lever 66. Said lever 66 is forked at its free end to receive a tongue 67 secured to a hollow cylinder 68. Said tongue 67 is held in the forked end of lever 66 by means of a pin 69 about which it freely pivots. Shift fork 60 is provided with an extension 70 located concentrically with respect to pivot 71 of lever 60 and a hollow cylinder 72 is pivotally mounted about extension 70. Hollow cylinder 72 telescopes into cylinder 68 and a spring 73 is compressed in cylinder 72 so as to tend to cause cylinder 72 and cylinder 68 to spread apart.

When it is desired to shift collar 53, external lever 64 is thrown to the side which will effect the desired shift, the lever being limited in its movement by a suitable stop (not shown). Since the length of lever 66 plus the length of cylinder 72 when extended, is greater than the length of lever 61, spring 73 will be compressed and will exert a turning effort on lever 61 in the opposite direction to that imparted to lever 64. Shift fork 60 and collar 53 will then move in the desired direction under the action of the spring 73 until pin 56 strikes one end or the other of slot 58, whereupon a pause will be effected until sleeve 40 is unlocked and moved to its other position. When the second depression in sleeve 40 is aligned with ball 50 so as to unlock collar 53, the spring 73 will then continue the movement of shift collar 53, thereby locking sleeve 40 in place.

It is understood that several locking bolts may be used as desired, and likewise several pins 56 and associated slots may be used to secure greater effectiveness of both devices and a better balance. It is understood further that although the locking means for shift sleeve 40 is shown as applied to a particular form of shift sleeve and a particular type of gearing, it is not necessarily limited to such a disclosure and that the scope of the invention, therefore, should be determined only by the appended claims.

I claim:

1. A coupling for machine elements adapted to change their relative direction of rotation, comprising spaced elements to be coupled, a member for establishing a connection between the elements, means responsive to a change in the relative direction of rotation of the machine elements for moving the member to or from a coupling establishing position, means for rendering the member independent of changes in relative direction of rotation, said last-mentioned means comprising a bolt movable into and out of the path of movement of the connecting member to stop or to permit movement of the connecting member, and means for controlling the position of the bolt, said position-controlling means comprising a shiftable element having a depression therein to receive the bolt when the bolt is moved out of the path of movement of the connecting member, resilient means for moving the shiftable member from a position wherein the depression is not aligned with the bolt to a position wherein the depression is aligned with the bolt and thence to a third position wherein the depression again is not aligned with the bolt, means for biasing the spring to effect such movement of the shiftable element and means for arresting the movement of the shiftable element in the position wherein the depression is aligned with the bolt until a complete movement of the connecting member has been effected.

2. Planetary gearing comprising a drive shaft, a driven shaft, a sun gear secured to the drive shaft, a sun gear splined to the driven shaft, planet pinions meshing with the sun gears, a rigid carrier for the planet pinions, means for arresting the rotation of the carrier and for connecting the carrier to a sun gear, said connecting means being productive of axial thrusts, and means for supporting the carrier from one of the shafts and for taking a portion of the end thrusts, said last-mentioned means comprising a sleeve supported by and abutting said one of the shafts, and a radial flange on the sleeve passing between the planet gears, said carrier having close fitting grooves for receiving the flange, whereby to support the carrier from the flange.

3. Planetary gearing as described in claim 2, the sleeve-supporting shaft being hollow and said sleeve being mounted within the hollow portion of said shaft.

4. A coupling for machine elements adapted to change their relative direction of rotation comprising spaced elements to be coupled, a member for establishing a connection between the elements, means responsive to a change in the relative direction of rotation of the machine elements for moving the member to or from a coupling establishing position, and means for rendering the member independent of change in relative direction of rotation, said means comprising a bolt member movable into and out of the path of movement of the connecting member to arrest or release said connecting member, means for controlling the position of the bolt, said means being shiftable from a position preventing the bolt from moving out of the path of movement of the connecting member, through a position permitting such movement, and thence to a second position again preventing such movement, and means for causing the position-controlling means to pause at the position permitting movement of the connecting means.

5. A coupling for machine elements adapted to change their relative direction of rotation comprising spaced elements to be coupled, a member for establishing a connection between the elements, means responsive to a change in the relative direction of rotation of the machine elements for moving the member to or from a coupling establishing position, and means for rendering the member independent of change in relative direction of rotation, said means comprising a bolt member movable into and out of the path of movement of the connecting member to arrest or release said connecting member, means for controlling the position of the bolt, said means being shiftable from a position preventing the bolt from moving out of the path of movement of the connecting member, through a position permitting such movement, and thence to a second position again preventing such movement, said last-mentioned means comprising a circumferentially oscillatable ring.

6. A coupling for machine elements adapted to change their relative direction of rotation, comprising spaced concentric elements, one of which has straight teeth thereon and the other of which has spiral splines, a slidable sleeve for establishing a connection between the elements, said sleeve having straight teeth at one end thereof for engaging the straight teeth of one of the elements and having spiral splines at the other end thereof adapted to engage the spiral splines of the said other element, means for producing relative rotation between the connecting member and the element having the spiral splines such that axial movement of the connecting member results, an opening in one of the elements to be coupled, a bolt in said opening having cammed ends, spaced depressions in the connecting member adapted to receive one of the cammed ends of the bolt, a ring for retaining the bolt in place, said ring being shiftable and having a depression which when aligned with the bolt cooperates with the other cammed end thereof and permits said bolt to be cammed out of either depression in the connecting member, means for shifting said ring to a position wherein the bolt is locked in one or the other of the depressions in the connecting member whereby to prevent axial movement of said member, spring means for moving the ring from a position wherein the depression therein is on one side of the bolt, to a second position wherein the depression is aligned with the bolt, and thence to a third position on the other side of the bolt, and means for causing the ring to pause in the position wherein the depression therein is aligned with the bolt.

PALMER ORR.